United States Patent
Park et al.

(10) Patent No.: US 9,739,592 B2
(45) Date of Patent: Aug. 22, 2017

(54) MULTIPLE BEAM PATH LASER OPTICAL SYSTEM USING MULTIPLE BEAM REFLECTOR

(71) Applicant: FOUNDATION FOR RESEARCH AND BUSINESS, SEOUL NATIONAL UNIVERISTY OF SCIENCE AND TECHNOLOGY, Seoul (KR)

(72) Inventors: Ik-Keun Park, Seoul (KR); Hae-Sung Park, Uiwang-si (KR); Tae-Sung Park, Seoul (KR); Dong-Ryul Kwak, Seoul (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 14 days.

(21) Appl. No.: 14/929,028

(22) Filed: Oct. 30, 2015

(65) Prior Publication Data

US 2016/0123717 A1    May 5, 2016

(30) Foreign Application Priority Data

Oct. 31, 2014 (KR) .......................... 10-2014-0150668

(51) Int. Cl.
  *G01B 11/02* (2006.01)
  *G01B 9/02* (2006.01)

(52) U.S. Cl.
  CPC ..... *G01B 9/02027* (2013.01); *G01B 9/02018* (2013.01); *G01B 9/02019* (2013.01)

(58) Field of Classification Search
  CPC ............ G01B 9/02027; G01B 9/02028; G01B 9/02016; G01B 9/02018; G01B 9/02019;
  (Continued)

(56) References Cited

U.S. PATENT DOCUMENTS 3,419,331 A * 12/1968 Diehr ................. G01B 9/02027
                                                    356/498
8,493,570 B2 * 7/2013 You .................... G01B 11/2441
                                                    356/516
(Continued)

FOREIGN PATENT DOCUMENTS

JP           01-141349       6/1989
JP          2012-063330      3/2012
(Continued)

OTHER PUBLICATIONS

KIPO Notice of Allowance dated Mar. 28, 2016, corresponding to Korean Patent application 10-2014-0150668, (5 pages).

*Primary Examiner* — Tarifur Chowdhury
*Assistant Examiner* — Jonathon Cook
(74) *Attorney, Agent, or Firm* — Lewis Roca Rothgerber Christie LLP

(57) ABSTRACT

A multiple beam path laser optical system using a multiple beam reflector. The multiple beam path laser optical system includes a light source part to generate a laser beam to be irradiated to a specimen, the multiple beam reflector to split a laser beam incident thereto from the light source part and to provide a plurality of optical paths, a main beam splitter to irradiate the laser beam split by the multiple beam reflector to the specimen, a transducer to excite the specimen for signal detection of the laser beam irradiated to the specimen, and a control part to analyze an interference pattern of a laser beam reflected from the specimen and recombined in the main beam splitter.

14 Claims, 5 Drawing Sheets

(58) Field of Classification Search
CPC ... G01B 9/02056; G01B 11/2441; G01B 11/30; G01B 11/306; G01H 9/008
USPC .................................................. 356/450, 511
See application file for complete search history.

(56) References Cited

U.S. PATENT DOCUMENTS

| | | | |
|---|---|---|---|
| 8,711,364 B2* | 4/2014 | Brennan | A61B 3/102 356/479 |
| 2008/0198386 A1* | 8/2008 | Hirata | G01H 9/00 356/491 |

FOREIGN PATENT DOCUMENTS

| KR | 10-1998-0050105 | 9/1998 |
|---|---|---|
| KR | 10-2004-0090665 | 10/2004 |
| KR | 10-2011-0120110 | 11/2011 |

* cited by examiner

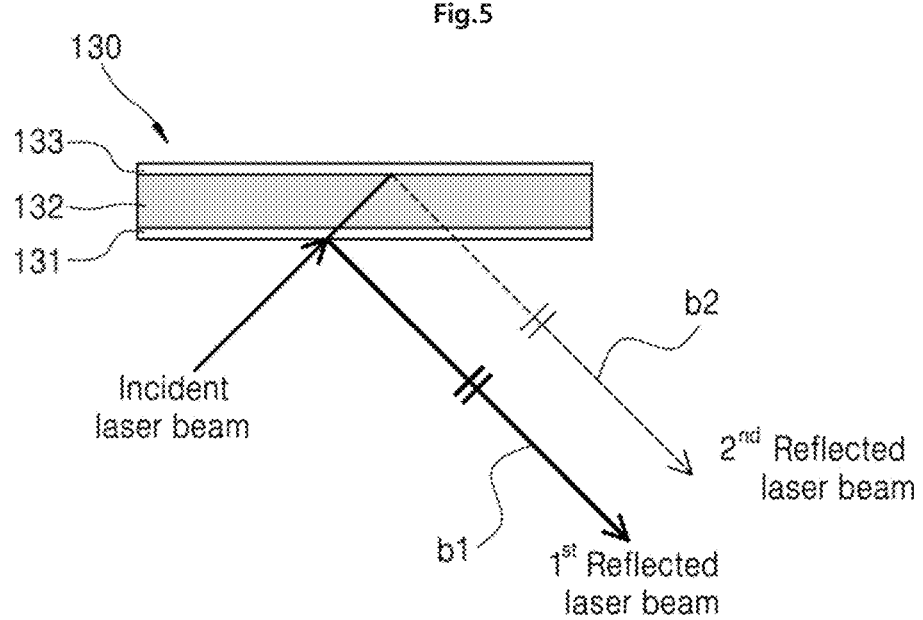

MULTIPLE BEAM PATH LASER OPTICAL SYSTEM USING MULTIPLE BEAM REFLECTOR

CROSS-REFERENCE TO RELATED APPLICATION

This application claims priority to Korean Patent Application No. 10-2014-0150668 filed on Oct. 31, 2014, and all the benefits accruing therefrom under 35 U.S.C. §119, the contents of which is incorporated by reference in its entirety.

BACKGROUND OF THE INVENTION

1. Field of the Invention

The present invention relates to an apparatus capable of non-destructively evaluating the characteristics of a measurement target by irradiating a laser beam to the measurement target, and more particularly to a multiple-beam path laser optical system using a multiple beam reflector, capable of generating a multiple laser beam and appropriately irradiating the multiple-laser beam to a measurement target.

2. Description of the Related Art

Defect inspection used in the fabrication process of a semiconductor and the like requires detecting fine defects, measuring the dimension of the detected detect with the high degree of precision, non-destructively inspecting a sample (for example, without chemically changing the specimen), actually obtaining predetermined inspection results with respect to, for example the number, the positions, the dimension, and the type of inspected defects when the same specimen is inspected, and inspecting a plurality of specimens within a predetermined period of time.

When a non-destructive inspection is performed among them to evaluate the characteristics of a thin film or a semiconductor chip, a laser optical system has been recently used.

Regarding a method and an apparatus for inspecting the internal characteristic of an object using the laser in a non-contact way, various patents are suggested by several inventors.

For example, referring to FIG. 1, a laser beam generated from alight source part 10 is irradiated to a mirror 30 and a specimen 40 by a beam splitter 20, and the irradiated laser beam is analyzed by a control part 50 based on an interference pattern.

However, in the conventional optical system, the intensity of light and the polarizing state may be varied due to environmental changes, such as heating, a surrounding temperature, or fine vibration, resulting from the use of the laser for a long time.

Accordingly, when two specimens, which are different from each other, are inspected, the two specimens must be sequentially and independently inspected. Therefore, it is difficult to inspect the two specimens under mutually different conditions.

In other words, since a conventional laser optical system has a single optical path, the difference between intensities of laser beams irradiated to the first specimen and the next specimen may be made due to surrounding influences when the specimens are continuously inspected. Accordingly, the significant measurement error may be made between the specimens.

As a prior art, there is Korean Unexamined Patent Publication No. 10-2011-0120110 entitled "Laser beam apparatus which uses more than 2 laser optical system and method thereof".

SUMMARY OF THE INVENTION

The present invention provides a multiple beam path laser optical system using a multiple beam reflector, capable of simultaneously inspecting a plurality of specimens under the same environment by generating a plurality of optical paths in one non-destructive device. To this end, there is required a technology and an apparatus for splitting a laser beam generated from a laser generator into a plurality of laser beams and allowing the laser beams to be incident to the specimens.

The present invention provides a multiple beam path laser optical system using the multiple beam reflector, capable of performing non-destructive inspection by simultaneously irradiating a laser beam to a plurality of specimens through a plurality of optical paths.

According to one embodiment, there is provided a multiple beam path laser optical system using a multiple beam reflector, which includes a light source part to generate a laser beam to be irradiated to a specimen, the multiple beam reflector to split the laser beam incident thereto from the light source part and to provide the laser beam in a form of a plurality of optical paths, a main beam splitter to irradiate the laser beam split by the multiple beam reflector to the specimen, a transducer to excite the specimen for signal detection of the laser beam irradiated to the specimen, and a control part to analyze an interference pattern of a laser beam reflected from the specimen and recombined in the main beam splitter.

According to one embodiment, the multiple beam reflector includes a front glass to generate a first reflected laser beam by reflecting the laser beam incident from the light source part, a glass base coupled to one side of the front glass, and a reflective layer arranged in opposition to the front glass based on the glass base to generate a second reflected laser beam.

According to one embodiment, the first reflected laser beam and the second reflected laser beam are irradiated in parallel to each other.

According to one embodiment, the front glass is half-coated such that the front glass has transmittance of 45±5%.

According to one embodiment, the reflective layer is coated with an aluminum (Al) coating film such that 90% or more of the laser beam transmitted through the front glass is reflected again.

According to one embodiment, a mirror is further provided at one side of the transducer to form an interference of the laser beam incident to the specimen.

According to one embodiment, a plurality of specimens are provided at one side of the transducer.

According to one embodiment, the control part includes a screen to provide information so that a user may visually recognize the information based on the converted signal.

According to one embodiment, there is provided a multiple beam path laser optical system using a multiple beam reflector, which includes a light source part to generate a laser beam to be irradiated to a specimen, first and second multiple beam reflectors to split a laser beam incident thereto from the light source part and to provide the laser beam in the form of a plurality of optical paths, first and second main beam splitters to irradiate the laser beam split by the first and second multiple beam reflectors to the specimen, first and second transducers to excite the specimen for signal detection of the laser beam irradiated to the specimen, and first and second control parts to analyze an interference pattern of a laser beam reflected from the specimen and recombined in the main beam splitter.

According to one embodiment, there is provided an inspection method of a multiple beam path laser optical system using a multiple beam reflector, which includes splitting a laser beam incident to the multiple beam reflector from a light source part by a front surface and a rear surface of the multiple beam reflector to provide a plurality of optical paths, irradiating the split laser beam to a plurality of specimens, forming an interference pattern by recombining the laser beam irradiated to the specimens, and analyzing the specimens based on the formed interference pattern.

According to one embodiment, the laser beam incident to the multiple beam reflector is classified into a first reflected laser beam reflected from a surface of a front glass and a second reflected laser beam reflected from a reflective layer, and the inspection method further includes irradiating the first reflected laser beam and the second reflected laser beam in parallel to each other.

According to one embodiment, specimens are arranged corresponding to an interval between the first reflected laser beam and the second reflected laser beam split by the front surface and the rear surface of the multiple beam reflector.

Details of other embodiments are included in the detailed description and the accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

The same reference numerals are assigned to the same elements throughout the specification, and sizes, positions, and coupling relationships of the elements may be exaggerated for clarity. In addition, the details of the generally-known technology that makes the subject matter of the present invention unclear will be omitted in the following description.

As described above, according to the present invention, the non-deconstructive inspection can be performed with respect to the specimens under the same environment condition, so that the inspection condition can be prevented from changed with respect to each specimen due to the environmental change. Accordingly, the inspection reliability can be increased.

BRIEF DESCRIPTION OF THE DRAWINGS

FIG. 5 is a schematic view showing the principle of a multiple beam reflector according to the present invention.

DETAILED DESCRIPTION OF THE INVENTION

Hereinafter, a laser optical system according to the embodiment of the present invention will be described with reference to accompanying drawings.

Figure 1:
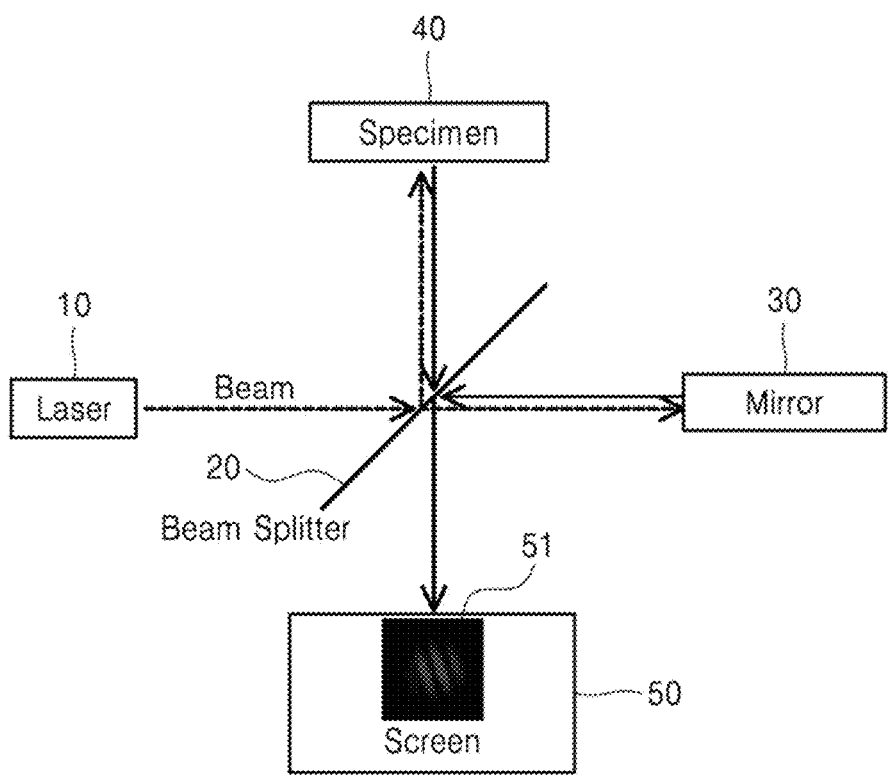
FIG. 1 is a schematic view showing a laser optical system according to the related art.
Figure 2:
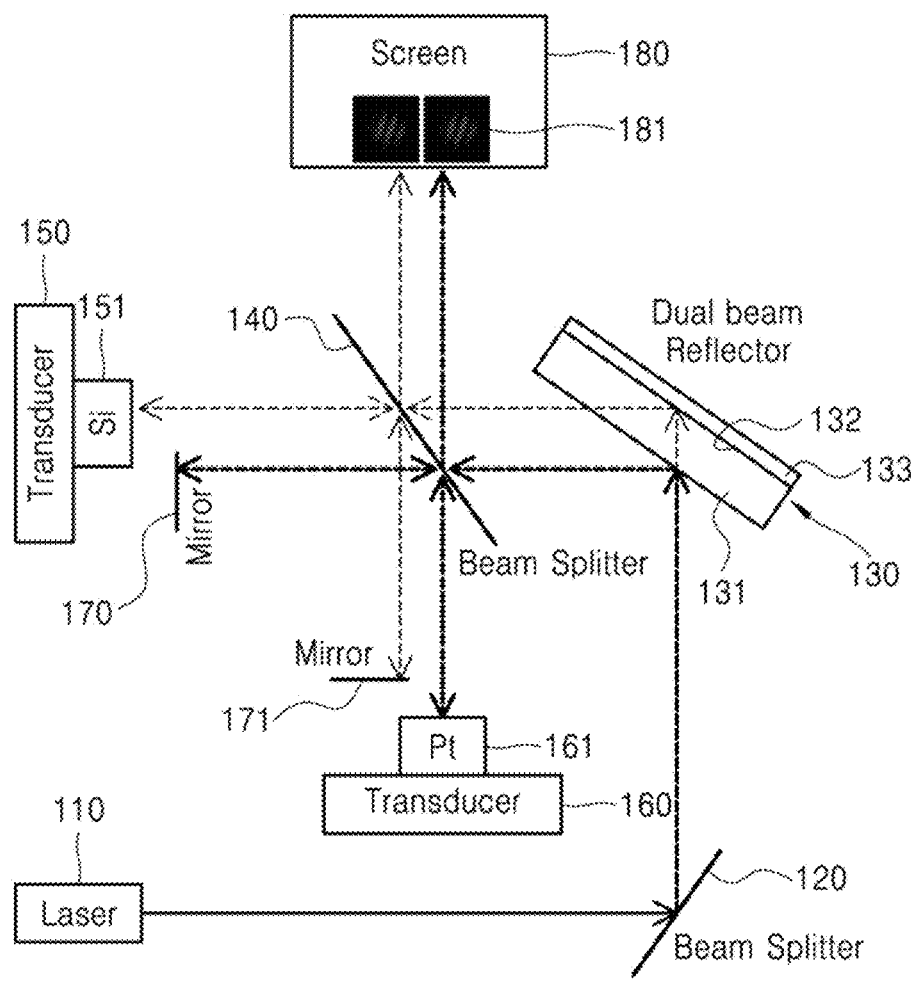
FIG. 2 is a schematic view showing a laser optical system according to the first embodiment of the present invention.

FIG. 2 is a view showing a laser optical system 100A according to the first embodiment of the present invention. A laser optical system 100A according to the first embodiment includes a light source part 110 to generate a laser beam to be irradiated to a specimen, a multiple beam reflector 130 to split a laser beam incident thereto from the light source part 110 and to provide the laser beam in the form of a plurality of optical paths, a main beam splitter 140 to irradiate the laser beam split by the multiple beam reflector 130 to a plurality of specimens 151 and 161, transducers 150 and 160 to transfer vibration in order to detect a signal of a laser beam irradiated to the specimen, and a control part 180 to analyze an interference pattern of laser beams as the laser beams are reflected from the specimens and combined in the beam splitter 140.

The light source part 110 includes a laser generator to generate a laser beam to be irradiated to the specimen.

The laser generator generates a laser beam having an appropriate wavelength required for a process and irradiates the laser beam to the target.

For example, the laser beam may include a helium-neon laser beam.

The multiple beam reflector 130 reflects the laser beam incident thereto from the light source part 110 in the form of plural laser beams and provides the plural laser beams to the specimens. The multiple beam reflector 130 may be configured to reflect a wavelength in the range of 430 nm to 670 nm for the stable reflection of the laser beam under the setting condition.

Referring to FIG. 5, the multiple beam reflector 130 includes a front glass 131, a glass base 132, and a reflective layer 133.

The laser beam incident to the multiple beam reflector 130 includes a first reflected laser beam b1 reflected from the surface of the front glass 131 and a second reflected laser beam b2 reflected from the reflective layer 133.

In other words, laser beams are reflected from front and rear surfaces of the multiple beam reflector 130, and the first and second reflected laser beams b1 and b2, which are reflected, are maintained in parallel to each other.

Accordingly, the front glass 131 is half-coated to reflect a portion of the incident laser beam and to transmit a remaining portion of the incident laser beam. The front glass 131 is preferably formed to have the transmittance of 45±5% so that the first reflected laser beam b1 reflected from the front glass 131 and the second reflected laser beam b2 reflected from the reflective layer 133 have similar environmental conditions such as the intensities of the laser beams.

In addition, the reflective layer 133 may be coated with an aluminum (Al) coating film so that 90% or more of the laser beam transmitted through the front glass 131 provided on a front surface of the reflective layer 133 may be reflected again.

A beam splitter 120 or a mirror may be further provided between the light source part 110 and the multiple beam reflector 130 to change the angle of the laser beam irradiated to the multiple beam reflector 130 from the light source part 110.

The transducers 150 and 160 are mounted to attach the specimens 151 and 161 thereto to provide vibration for the detection of signals of the laser beam irradiated to the specimens, thereby inducing the signals so that the characteristics of the specimens may be analyzed by a control part to be described. In other words, the traducers 150 and 160 may cause the displacement of the surfaces of the specimens, and may detect the difference by a laser.

A plurality of transducers 150 and 160 may be provided according to the number of specimens so that the measurement may be simultaneously performed. According to one embodiment of the present invention, since two specimens have been described for the illustrative purpose, two transducers are provided.

Mirrors 170 and 171 may be further provided at one side of the transducer 150 and one side of the transducer 160 to form the interference pattern of the laser beam incident to the specimen.

The control part 180 checks the interference pattern formed by the specimens 151 and 161 and the mirrors 170 and 171, and performs signal processing through Fourier spectrum analysis if the contrast of the interference pattern is changed according to the excitation levels of the transducers 151 and 161 to evaluate the characteristics of the specimens.

The control part 180 may include a charge coupled device (CCD) camera to acquire the interference pattern and a screen to allow a user to visually recognize the contrast change of the interference pattern 181.

In FIG. 2, arrows marked in solid and dotted lines represent the movement directions of the laser beams. The laser beam generated from the light source part 110 is incident to the multiple beam reflector 130 through the beam splitter 120.

The laser beam incident to the multiple beam reflector 130 is split into a plurality of optical paths by the front surface and the rear surface of the multiple beam reflector 130, that is, the front glass 131 and the reflective layer 133.

The split laser beams are irradiated to the specimens 151 and 161. The laser beams irradiated to the specimens 151 and 161 are reflected by the specimens 151 and 161, and the phases of the laser beams are changed by the transducers attached to the specimens, respectively.

The control part 180 analyzes the interference pattern formed due to the changed phase, and the contrast change of the interference pattern 181 is expressed on the screen according to the analysis result.

Figure 3:
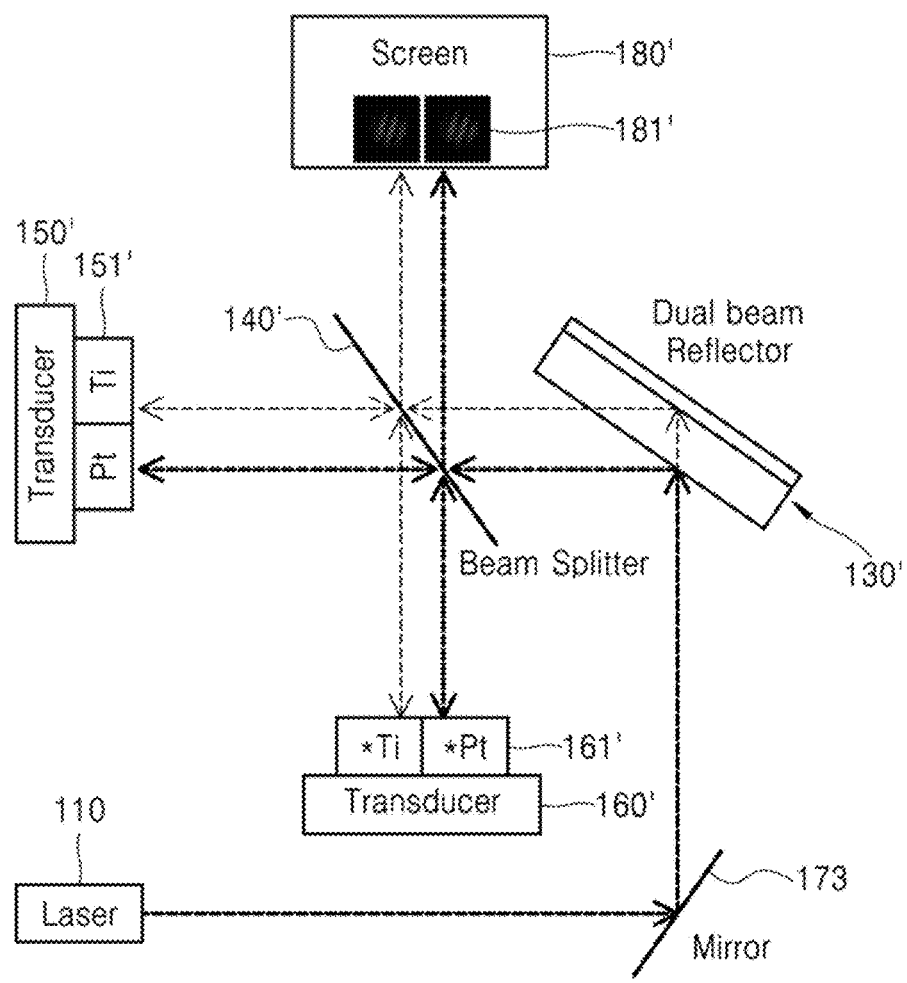
FIG. 3 is a schematic view showing a laser optical system according to the second embodiment of the present invention.

FIG. 3 is a view showing a laser optical system according to the second embodiment of the present invention, and the configuration of the laser optical system 100B according to the second embodiment is similar to that of the laser optical system according to the first embodiment.

However, in the second embodiment, two specimens 151' or 161' are closely provided at one side of each of the transducers 150' and 160'.

Therefore, although a mirror is provided at one side of each transducer in order to form the interference of the first reflected laser beam or the second reflected laser beam applied to the specimen, the two specimens provided for each transducer may form the interference of each of the first reflected laser beam and the second reflected laser beam according to the second embodiment. Accordingly, the mirror needs not be provided.

In this case, two specimens attached to each of the transducers 150' and 160' need to be arranged corresponding to an interval between the first reflected laser beam and the second reflected laser beam reflected from the front surface and the rear surface of the multiple beam reflector 130.

Therefore, according to the laser optical system of the second embodiment, four specimens may be simultaneously inspected.

Figure 4:
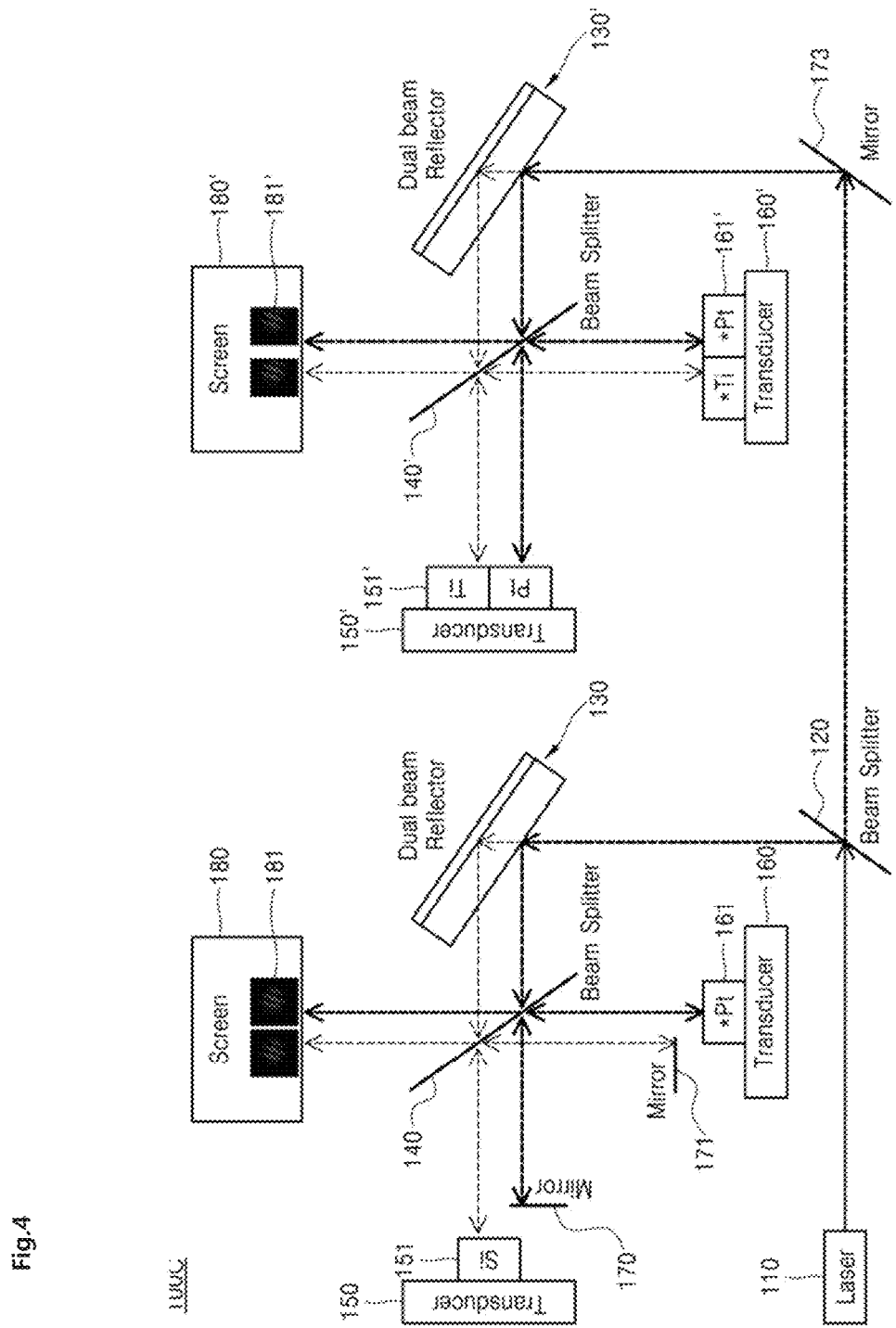
FIG. 4 is a schematic view showing a laser optical system according to the third embodiment of the present invention.

FIG. 4 is a schematic view showing a laser optical system according to the third embodiment of the present invention. The laser optical system according to the third embodiment is configured by mixing the configurations of the laser optical systems according to the first and second embodiments with each other.

In other words, the laser optical system according to the third embodiment includes a light source part 110 to generate a laser beam to be irradiated to a specimen, first and second multiple beam reflector 130 and 130' to split the laser beam incident thereto from the light source part 110 and to provide the laser beams having a plurality of optical paths, first and second main beam splitters 140 and 140' to irradiate the laser beam split by the multiple beam reflector 130 and 130' to a plurality of specimens 151, 161, 151', and 161', first and second transducers 150, 160, 150', and 160' to provide vibration in order to detect a signal of a laser beam irradiated to the specimen, and first and second control parts 180 and 180' to analyze an interference pattern of laser beams as the laser beams are reflected from the specimens and combined in the beam splitter.

In other words, the laser beams generated from the light source part 110 are transmitted or reflected through the first beam splitter 120 and a mirror 173 and incident to the multiple beam reflectors 130 and 130'.

The laser beams incident to the multiple beam reflectors 130 and 130' are split into a plurality of optical paths by the front surface and the rear surface of the multiple beam reflector 130 and 130, that is, the front glass 131 and the reflective layer 133.

The split laser beams are irradiated to the specimens 151, 161, 151', and 161'. In this case, each specimen is excited by a transducer adjacent thereto, and each of the control parts 180 and 180' analyzes the characteristic of the specimen based on the interference pattern of the laser beam irradiated to each of the specimens 151, 161, 151', and 161', and information is visually expressed on a screen according to the analysis result.

Therefore, according to the laser optical system of the third embodiment, the inspection works for six specimens can be simultaneously performed.

Although the details of the laser optical system according to the present invention have been described in detail, it is obvious that various embodiments fall within the scope of the present invention.

However, the scope of the present invention is not limited thereto, but defined by not only appended claims, but also equivalents of the attached claims.

Although embodiments have been described for an illustrative purpose, the present invention is not limited thereto. The scope of the present invention is made by appended claims described later rather than the detailed description. In addition, it should be understood that the meaning and the scope of the claims, and all variations or modifications deduced from the equivalent concept fall within the scope of the present invention.

What is claimed is:

1. A multiple beam path laser optical system using a multiple beam reflector, the multiple beam path laser optical system comprising:
    a light source part to generate a laser beam to be irradiated to a plurality of specimens;
    the multiple beam reflector to split the laser beam incident thereto from the light source part and to provide the laser beam in a form of a plurality of optical paths;
    a main beam splitter to irradiate the laser beam split by the multiple beam reflector to the plurality of specimens;
    a plurality of transducers attached behind each of the plurality of specimens to vibrate the plurality of specimens for signal detection of the laser beam irradiated to the plurality of specimens; and a control part located at the place where the laser beam is applied squarely to analyze an interference pattern of the laser beam reflected from the plurality of specimens and recombined in the main beam splitter, wherein the multiple beam reflector includes a front glass to generate a first reflected laser beam by reflecting the laser beam incident from the light source part, a glass base coupled to one side of the front glass, and a reflective layer arranged in opposition to the front glass based on the glass base to generate a second reflected laser beam.

2. The multiple beam path laser optical system of claim 1, wherein the first reflected laser beam and the second reflected laser beam are irradiated in parallel to each other.

3. The multiple beam path laser optical system of claim 1, wherein the front glass is half-coated such that the front glass has transmittance of 45±5%.

4. The multiple beam path laser optical system of claim 1, wherein the reflective layer is coated with an aluminum (Al) coating film such that 90% or more of the laser beam transmitted through the front glass is reflected again.

5. The multiple beam path laser optical system of claim 1, further comprising a mirror provided at one side of the plurality of transducers to form an interference of the laser beam incident to the plurality of specimens.

6. The multiple beam path laser optical system of claim 1, wherein the control part includes a charge coupled device camera to acquire an interference pattern and a screen to allow a user to visually recognize contrast change of the interference pattern.

7. A multiple beam path laser optical system using a multiple beam reflector, the multiple beam path laser optical system comprises:

a light source part to generate a laser beam to be irradiated to a plurality of specimens;

first and second multiple beam reflectors to split the laser beam incident thereto from the light source part and to provide the laser beam in a form of a plurality of optical paths;

first and second main beam splitters to irradiate the laser beam split by the first and second multiple beam reflectors to the plurality of specimens and a plurality of other specimens, respectively;

first and second transducers attached behind each of the plurality of specimens and plurality of other specimens, respectively to vibrate the plurality of specimens for signal detection of the laser beam irradiated to the plurality of specimens; and first and second control parts located at the place where the laser beam is applied squarely to analyze an interference pattern of the laser beam reflected from the plurality of specimens and the plurality of other specimens, respectively and recombined in the main beam splitter, wherein the multiple beam reflector includes a front glass to generate a first reflected laser beam by reflecting the laser beam incident from the light source part, a glass base coupled to one side of the front glass, and a reflective layer arranged in opposition to the front glass based on the glass base to generate a second reflected laser beam.

8. The multiple beam path laser optical system of claim 7, wherein the first reflected laser beam and the second reflected laser beam are irradiated in parallel to each other.

9. The multiple beam path laser optical system of claim 7, wherein the front glass is half-coated such that the front glass has transmittance of 45±5%.

10. The multiple beam path laser optical system of claim 7, wherein the reflective layer is coated with an aluminum (Al) coating film such that 90% or more of the laser beam transmitted through the front glass is reflected again.

11. The multiple beam path laser optical system of claim 7, further comprising a mirror provided at one side of each of the first and second transducers to form an interference of the laser beam incident to the specimen plurality of specimens and the plurality of other specimens, respectively.

12. The multiple beam path laser optical system of claim 7, wherein the control part includes a charge coupled device camera to acquire an interference pattern and a screen to allow a user to visually recognize contrast change of the interference pattern.

13. An inspection method of a multiple beam path laser optical system using a multiple beam reflector, the inspection method comprising:

allowing a laser beam to be incident to the multiple beam reflector from a light source part;

splitting the incident laser beam by a front surface and a rear surface of the multiple beam reflector to provide the incident laser beam in a form of a plurality of optical paths;

irradiating the split laser beam to a plurality of specimens;

forming an interference pattern by recombining the laser beam irradiated to the plurality of specimens; and analyzing the specimens based on the formed interference pattern, wherein the multiple beam reflector includes a front glass to generate a first reflected laser beam by reflecting the laser beam incident from the light source part, a glass base coupled to one side of the front glass, and a reflective layer arranged in opposition to the front glass based on the glass base to generate a second reflected laser beam.

14. The inspection method of claim 13, wherein the plurality of specimens are arranged corresponding to an interval between the first reflected laser beam and the second reflected laser beam split by the front surface and the rear surface of the multiple beam reflector.

* * * * *